US006765565B2

United States Patent
Sayers et al.

(10) Patent No.: US 6,765,565 B2
(45) Date of Patent: Jul. 20, 2004

(54) METHOD FOR ENHANCING A SPORTING EVENT BY LOCALIZED INFORMATION DISPLAY

(75) Inventors: Craig Sayers, Sunnyvale, CA (US); Alan H. Karp, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 162 days.

(21) Appl. No.: 10/229,246

(22) Filed: Aug. 26, 2002

(65) Prior Publication Data

US 2004/0036771 A1 Feb. 26, 2004

(51) Int. Cl.[7] .............................................. G06T 15/00
(52) U.S. Cl. ..................................................... 345/418
(58) Field of Search ................................. 345/418, 619, 345/473, 474, 475; 701/300, 201; 340/572.2, 573

(56) References Cited

U.S. PATENT DOCUMENTS

| 5,697,844 A | * | 12/1997 | Von Kohorn | ................ | 463/40 |
| 5,948,040 A | * | 9/1999 | DeLorme et al. | ........... | 701/201 |
| 6,710,713 B1 | * | 3/2004 | Russo | ..................... | 340/573.1 |

\* cited by examiner

Primary Examiner—Phu K. Nguyen

(57) ABSTRACT

A method for enhancing a sporting event by localized display of information is disclosed. Information is collected and correlated with an associated spatial location. A portion of that information is selected based on its relevance. The portion of information selected is displayed at that spatial location.

19 Claims, 20 Drawing Sheets

600

```
┌─────────────────────────────────────────────┐
│ Access & Enter Info of Location, Hits,      │
│ Batter, Pitcher, Fielding, etc.             │
│ 651                                         │
└─────────────────────────────────────────────┘
                      ↓
┌─────────────────────────────────────────────┐
│ Select Info. Based on This Batter vs. That  │
│ Pitcher on This Field; Current Game &       │
│ Previous Games                              │
│ 652                                         │
└─────────────────────────────────────────────┘
                      ↓
┌─────────────────────────────────────────────┐
│ Project Performance & Trajectories onto     │
│ Field                                       │
│ 653                                         │
└─────────────────────────────────────────────┘
```

Fig. 6D

| 744 | Next Gate: | 9 |
|---|---|---|
| | Fastest Time Yet: | 045.378 |

Fig. 7B

METHOD FOR ENHANCING A SPORTING EVENT BY LOCALIZED INFORMATION DISPLAY

FIELD OF THE INVENTION

Embodiments of the present invention relate to the field of information display. Specifically, embodiments of the present invention relate to a method for providing an on-site replay at a sporting event by localized display of information.

BACKGROUND OF THE INVENTION

Modern sporting events typically take place before sizable audiences who view the event live at various venues. Such sporting events are sometimes televised, either live or pre-recorded, to a remote viewing audience as well. Television provides great benefits to its sporting audience by allowing the sharing of replays, expert information, and statistical resources with the television audience. As an example, replays are televised, sometimes at speeds slow relative to the original action, and accompanied by expert commentary.

Television commentators with statistical and other information resources at their disposal sometimes use "light pens" and other devices to mark play and action diagrams "on-screen" provide television viewers with valuable play-by-play and stop action analyses. Statistical information can be displayed on-screen with the televised images. Thus, television sporting audiences enjoy significant enhancement of the sporting event itself. To some degree owed to this enhancement, a television sporting audience conventionally enjoys some advantages over a live sporting audience.

Some statistical information is displayed to live sporting audiences on conventional score boards. Also, attempts have been made to accord live sporting audiences with some of the other advantages enjoyed by television audiences. Conventionally, large screen television screens are provided at some sporting venues to allow live sporting audiences to view action replays and other television-like displays. Further, television affects the conduct of some sporting events. For example, video replays are often cast before officials who review the replay, sometimes in slow motion and/or from varying angles and other views. They render decisions based on these replays, which affect the conduct of play. Such conventional attempts to enhancing a live sporting event may not be adequate.

Conventional approaches to adding television-like enhancement to live sporting events may lack adequacy because what is portrayed on the large screen televisions for observation by the live audience is often on much the same level as that telecast to a television audience. For example, the display of replays to the live audience may be substantially similar to the replay telecast to the television audience. Live observers see what television viewers see, and in that sense, the live audience might as well be watching the replay on television elsewhere. Thus, there is little advantage added to attending the sporting event live by the conventional replay display there.

Conventional approaches to adding television-like enhancement to live sporting events may also lack adequacy because what is portrayed on the large screen televisions for observation by the live audience may be displayed with a viewing resolution that is somewhat inferior to the quality they could obtain by watching television elsewhere. This inferior resolution can arise because the large screens used to display television images to a large live audience at some sporting venues are often mounted much further from the viewers, and in varying and perhaps sub-optimal lighting than televisions screens used by many television sporting audiences, which may tend to be smaller and more intimate.

Conventional approaches to adding television-like enhancement to live sporting events may also lack adequacy because what is portrayed on the large screen televisions for observation by the live audience may lack context for larger portions of the live audience. For example, a replay displayed to a live audience may show the action from a different angle and/or distance to most of the live audience than that from which they are viewing the live action. This can cause some live audience members to have to exert concentration to place the replay or other display in the context of the live action they are otherwise watching. This can confuse some live audience members, and can possibly detract from their live sporting event experience.

Similarly, conventional approaches to adding television-like enhancement to live sporting events may also lack adequacy because what is portrayed on the large screen televisions for observation by the live audience can in some situations distract some of the live audience members. Some live audience members can be distracted because their attention is diverted from the area action, such as the rink, field, court, course, or the like. The attention of some live audience members can be diverted because of their efforts to concentrate on the video displays. This can cause some of the distracted audience members to miss on-going or developing action, interesting activity between actions such as formation developments, line-up or equipment changes, official, coach, and/or player conferences, and the like. This can also confuse some live audience members, and can also possibly detract from their live sporting event experience.

The conventional approaches to enhancing live sporting events by television are limited in their applicability to officials. Athletes themselves receive benefit, if at all, only indirectly. Conventional video replays may be used in some instances by officials, but players must wait for these officials to render decisions accordingly for television to have any affect on the conduct of their play.

Some of the potential inadequacies of conventional approaches to adding television-like enhancement to live sporting events can compound each other this can be somewhat problematic because it may tend to exacerbate the confusion and distraction. This can possibly further detract from the experience sought by those opting to attend a live sporting event. This may discourage live event attendance and/or be perceived as wasteful and expensive by those opting to attend a live sporting event, as well as promoters of such events.

SUMMARY OF THE INVENTION

A method for enhancing a sporting event by localized display of information is disclosed. In one embodiment, information is collected and correlated with an associated spatial location. A portion of that information is selected based on its relevance. The portion of information selected is displayed at that spatial location.

BRIEF DESCRIPTION OF THE DRAWINGS

FIG. 6D is a flowchart of the steps in a process for enhancing a baseball event according to one embodiment of the present invention.

FIG. 7B depicts a video timeline for information selection for enhancing a skiing event according to one embodiment of the present invention.

DETAILED DESCRIPTION OF THE INVENTION

Embodiments of the present invention are discussed primarily in the context of a method for enhancing a sporting event by localized display of information. In one embodiment, the method for enhancing a sporting event by localized display of information is effectuated by a system, which in one embodiment is a computer system. The computer system that effectuates the method for enhancing a sporting event by localized display of information can be any kind of computer system. For example, the computer system can be a workstation computer system, a personal computer system, a main-frame computer system, or a supercomputer system. Modules of the system for executing a method for enhancing a sporting event by localized display of information can be deployed in software, firmware, and/or hardware or any combination of software, firmware, and/or hardware. In one embodiment, a part of the system is deployed within a network environment. The network of this environment can be any kind of network, such as a local area network (LAN), wide area network (WAN), or the Internet.

Portions of the detailed descriptions of embodiments of the invention that follow are presented in terms of processes. Although specific steps are disclosed in figures herein describing the operations of these processes, such steps are exemplary. That is, embodiments of the present invention are well suited to performing various other steps or variations of the steps recited in the flowcharts of the figures herein. In one embodiment, such processes are carried out by processors and electrical/electronic components under the control of computer readable and computer executable instructions. The computer readable and computer executable instructions reside, for example, in data storage features, memory, registers and other components of a computer system. However, the computer readable and computer executable instructions may reside in any type of computer readable medium.

Exemplary Method and Systems

Figure 1:
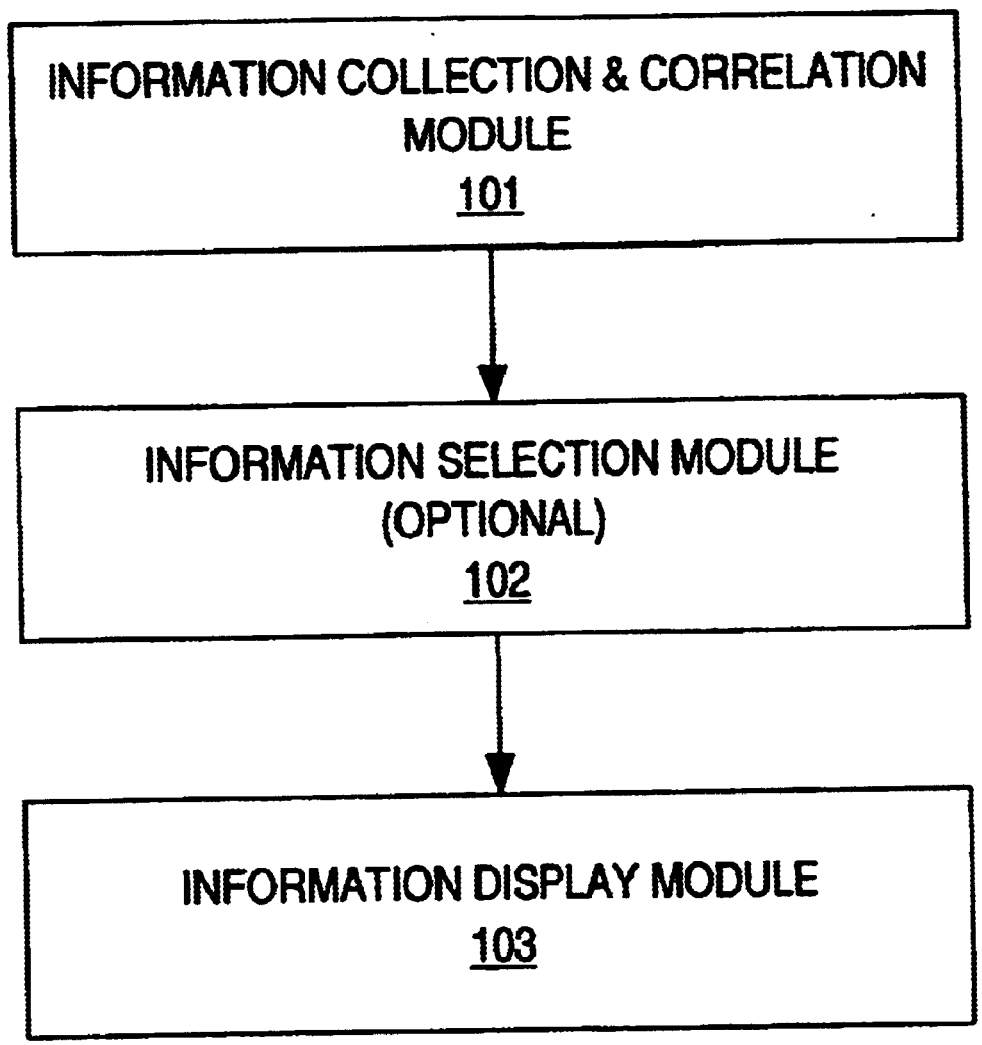
FIG. 1 is a block diagram of a system for enhancing a sporting event by localized display of information according to one embodiment of the present invention.

With reference to FIG. 1, a system 100 is described, which executes a method for enhancing a sporting event by localized display of information. System 100 has a module 101 for collecting and correlating information.

An information selection module 102 is coupled to information collection and correlation module 101. Module 102 for selecting information is optional. Information selection module 102 in some embodiments can be dispensed with. Its functionality therein can be achieved by a human operator. For example, in an exemplary ice hockey implementation (e.g., FIGS. 4A–4D, below), a human operating in the capacity of a sports television producer can fulfill the functionality accorded in various other embodiments by information selection module 102.

The display of information can be effectuated by an information display module 103, coupled to information module 102 (or its equivalent functionality).

Figure 2:
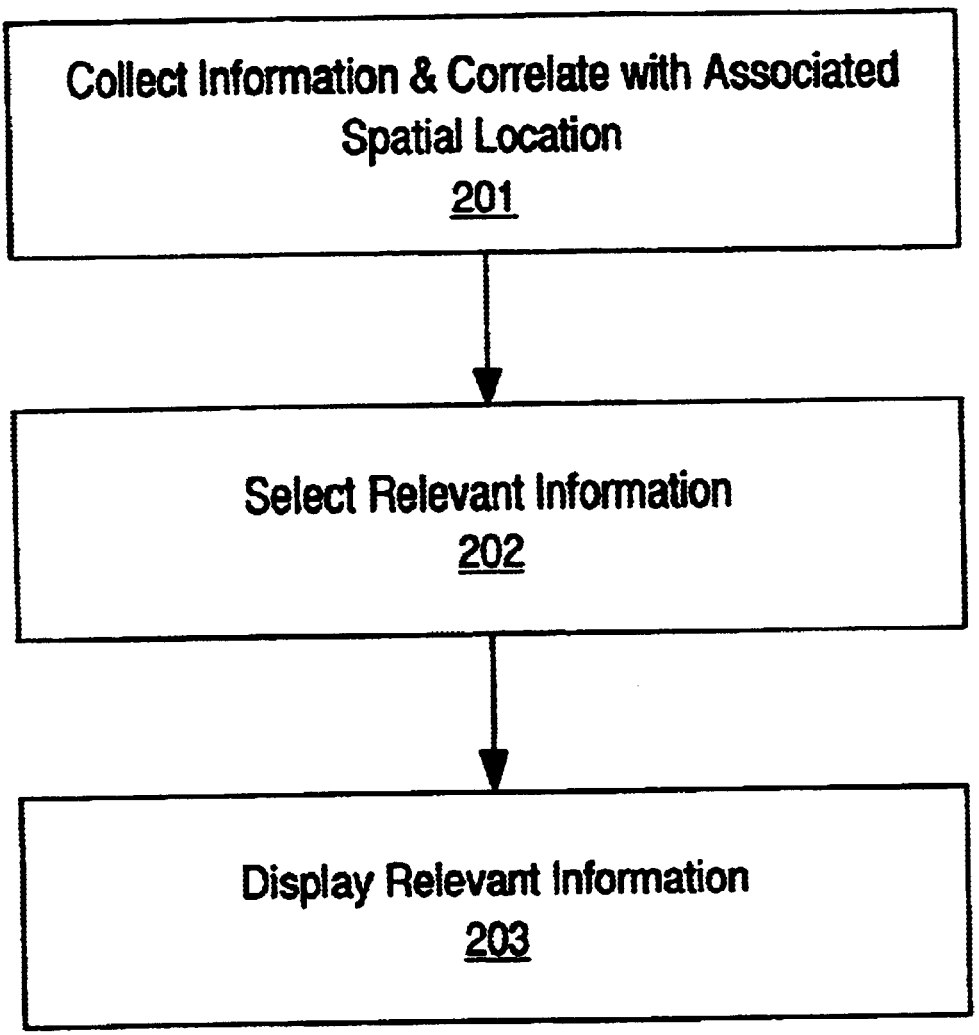
FIG. 2 is a flowchart of the steps in a process for enhancing a sporting event by localized display of information according to one embodiment of the present invention.

With reference to FIG. 2, a process 200 is described for providing an on-site replay at a sporting event by localized display of information. Process 200 begins with step 201, wherein information is collected and correlated with an associated spatial location. This can be performed, in one embodiment, by a module for collecting and correlating information such as module 101 (FIG. 1).

In step 202, relevant information is selected. This can be performed by an information selection module such as module 102 (FIG. 1). In some embodiments, the selection of relevant information can be performed by a human operator. For example, in an exemplary ice hockey implementation (e.g., FIGS. 4A–4D2, below), a human operating in the capacity of a sports television producer can select the relevant information by designating a portion of time during play for replay.

In step 203, the relevant information is displayed, completing process 200. The display of information can be effectuated by an information display module, such as module 103 (FIG. 1).

Figure 3:
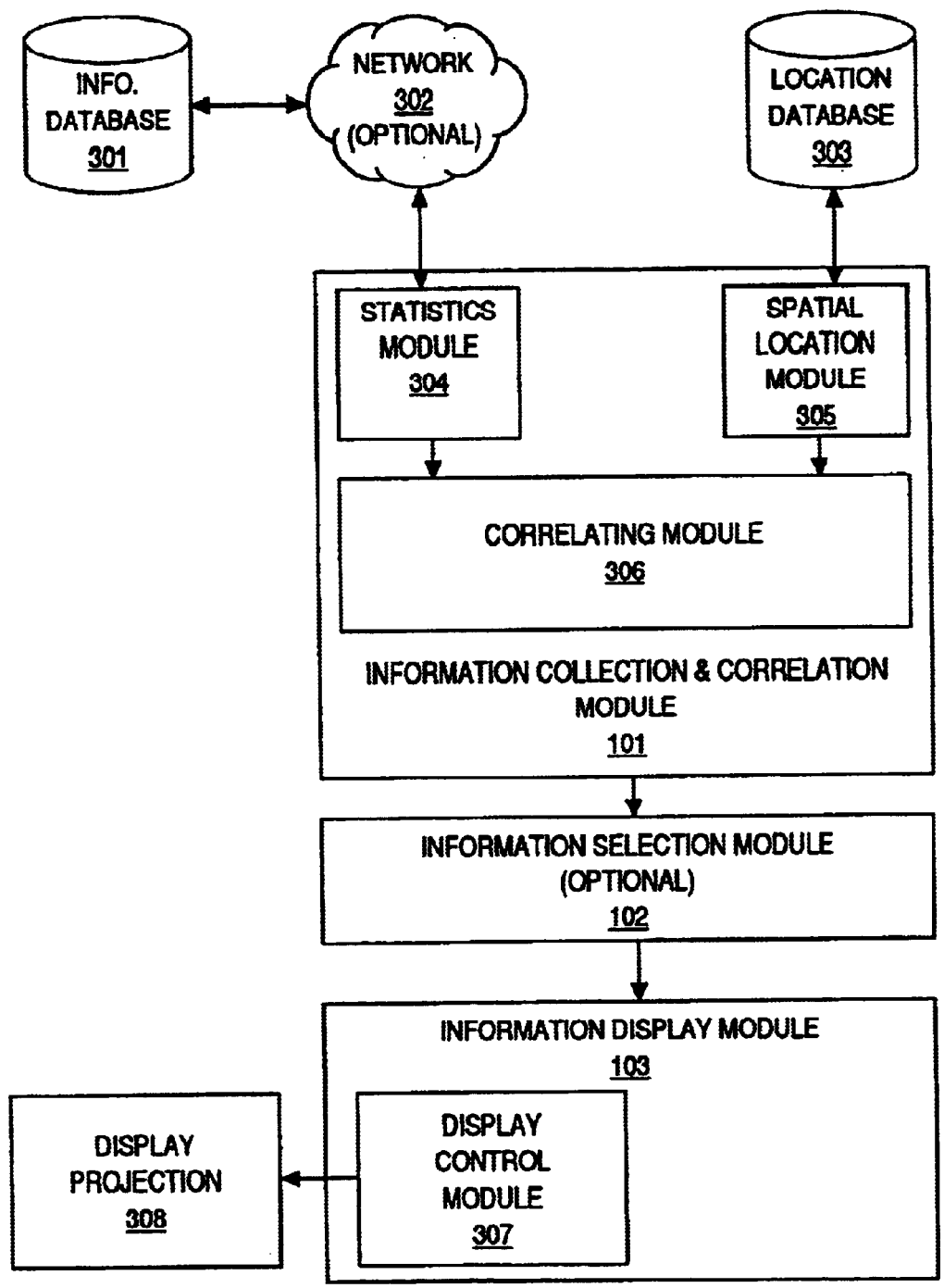
FIG. 3 is a block diagram of a system for enhancing a sporting event by localized display of information showing some components according to one embodiment of the present invention.

Referring now to FIG. 3, a system 300 for enhancing a sporting event by localized display of information is described with components, according to one embodiment. Information collection and correlation module 101 has a statistics module 304.

Statistics module 304 is coupled to an information database 301. In one embodiment, statistics module 304 is coupled directly to an information database 301. In another embodiment, statistics module 304 is coupled to an information database 301 via a network 302, which can be a LAN, WAN, the Internet, or any other network. Database 301 provides statistics module 304 with information regarding a sporting event to be enhanced by system 300. Such information can include historical information about performance of specific teams, players, and the like, under various circumstances such as particular fields of play, certain batters against certain pitchers, against other pitchers of the same throwing handedness, etc., weather, specific plays, and any other information.

Information collection and correlation module 101 also has a spatial location module 305. Spatial location module 305 is coupled to a location database 303. Optionally, spatial location module 305 is coupled to a location database 303 either directly or via a network. Location database 303 provides information to spatial location module 305 regarding positions, locales, and other spatial locations at the site (e.g., venue, playing field, ice rink, court, hillside, etc.) of a sporting event to be enhanced by system 300.

Information collection and correlation module 101 also has a correlating module 306. Correlating module 306 is coupled to statistics module 304 and spatial location. Correlating module 306 correlates the information collected by statistics module 304 with relevant spatial location information gathered by spatial location module 305. For example, information may be gathered by statistics module 304 about a certain batter's performance against a particular pitcher. Spatial location information that may be relevant to this information can include aspects of this performance at a particular ball field; for instance, the current field of play, and in particular, where this batter flies out, hits base hits, runs, etc., at the specified field.

In one embodiment, information collection and correlation module 101 is a computer based functionality. In another embodiment, the functions of information collection and correlation module 101 can be effectuated by a human analyst or statistician accessing database 301 and database 303 and manually or otherwise correlating the play statistics with the relevant spatial location information. Relevant information is selected in one embodiment by an information selection module 102, coupled to information collection and correlation module 101. Module 102 for selecting information is optional. Information selection module 102 in some embodiments can be dispensed with. As discussed above, its functionality therein can be achieved by a human operator.

The display of information can be effectuated by an information display module 103, coupled to information module 102 (or its equivalent functionality). Information display module 103 has a display control module 307. Display control module 307 is coupled to display projection functionality 308. Display control module 307 controls display projection functionality 308, which projects or otherwise displays information to the live sporting audience accordingly. Display projection functionality 308 can be effectuated by various media.

For example, in an exemplary ice hockey implementation, display projection functionality 308 can display enhancing information on video monitors under the surface of the ice. In an exemplary tennis implementation, lights under the court or projected from projectors above the court can display the spot on the court at which the tennis ball lands. In an exemplary downhill skiing implementation, the gates can be illuminated by projectors above and/or off to the side of the skiers' path. In an exemplary baseball or cricket implementation, historically recorded trajectories can be projected onto the field for base hits, runs, and flies out for the man at bat. Runs can be one color, flies out another, and runs a third. Solid lines can indicate hits in the present game; dashed lines recent games. In an exemplary track and field event implementation, the path of a runner in a foot race is denoted by lights embedded in the track.

It is appreciated that various such schema can be used to convey the information projected in any implementation by display projection 308. Further, displays can be selected and/or adjusted to achieve a number of effects and control. The display can be customized by using polarization filters, shutters, and the like. Customization of the display can be tailored for different parts of the live audience. Live audience members can be given polarized/shuttered glasses to wear for viewing special display effects during the game. Alternating between positive and negative images, audience members without their glasses will see constant illumination.

Correlating display/projection control with control of the television cameras used for televising the sporting event effectuates elimination of the displays projected live from the televised action and scene. Optionally, the images for display to the live audience can be replaced with images appropriate for viewing by the television audience. For example, television cameras for a particular part of the telecast can be selected that are not trained on the area of a display to the live audience. Alternatively, the live display images can be electronically removed, such as by comparative image subtraction or other techniques.

Further, the images collected and recorded by a multitude of cameras can be merged into a single image for display upon a large part of the surface upon which said sporting event takes place (e.g., the ice rink for hockey, etc.) using techniques known in the art such as image mosaicing.

To avoid distracting players and/or television viewers, wavelengths can be used for live display projection that are not readily visible to the television cameras (or the live audience without, e.g., special glasses, another frequency-enhancing means, or the like). For example, wavelengths at the extreme red or blue ends of the visible spectrum can be used for the projected live display. Alternatively, the display can be projected with low contrast against the background color. Visibility for the live audience members is improved, e.g., by special glasses, etc. from the nearly invisible to the discernable. Projectors for the live audience display can be calibrated with appropriately distorted images and several projectors for imaging each individual spot in the display. This advantageously reduces any possibility of distracting players, because shadowing problems are minimized and players see a larger number of dimmer projectors (e.g., as opposed to a small number of bright ones). In some cases, the display is built into the playing surface, for example, video monitors under the surface of the ice at a hockey rink, and lights embedded around a running track (e.g., for sports and field events).

A number of exemplary implementations adapted to particular sports are discussed herein by way of illustration. These exemplary implementations are presented to describe the operation of an embodiment of the present invention, and are not meant to be limiting. It is thus further appreciated that embodiments of the present invention are well-suited to enhance the live audience experience of any of a wide variety of different sporting events. Such sporting events other than those described by exemplary implementations herein can include, but are not limited to track, soccer, football, and basketball.

Exemplary Ice Hockey Implementation

Figure 4A:
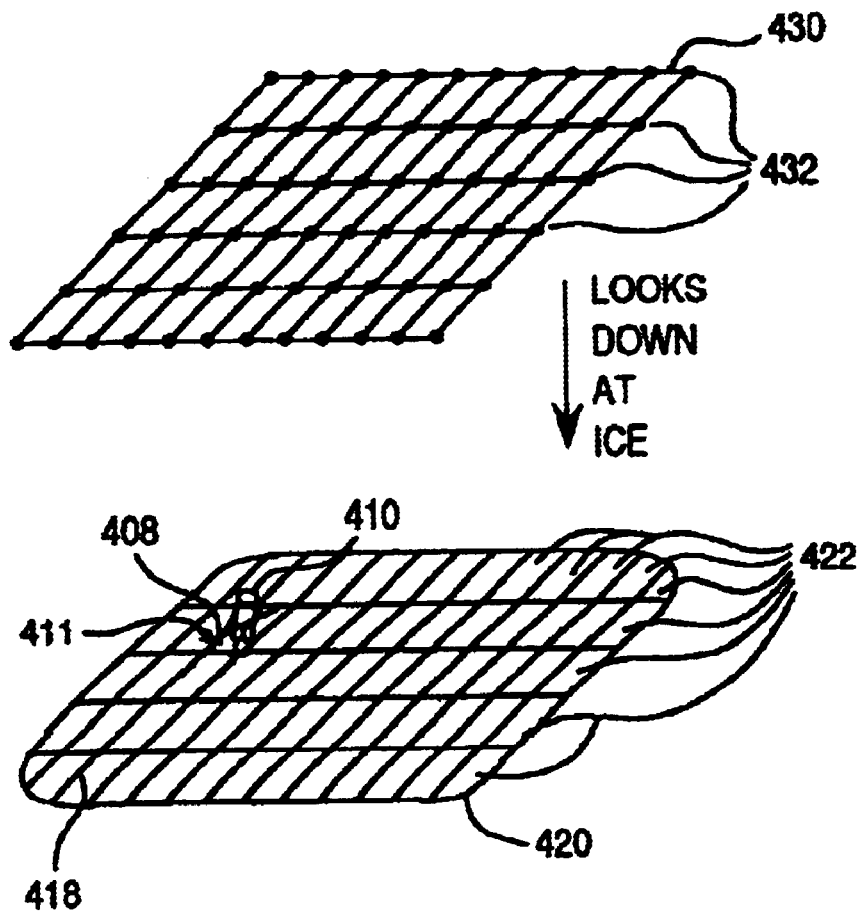
FIG. 4A depicts information collection and spatial correlation for enhancing an ice hockey event according to one embodiment of the present invention.

With reference to FIG. 4A, an array 430 of cameras 432 looks down at an ice rink 420. Array 430 can be mounted for example in a ceiling area.

Alternatively, array 430 can be mounted circumfrentially around the upper deck edge of the arena housing the rink 420. Ice rink 420 has an display array 418 built into its base, beneath the transparent ice, or embedded therein. In one embodiment, the display units 422 comprising display array 418 are sub-arrays of light emitting diodes (LED), or another programmable light source. FIG. 4A also depicts an exemplary hockey player 410, skating on the surface of the ice covering display array 418, and holding a stick 408 and handling a puck 411, which slides across the surface of the ice.

Cameras 432 are calibrated. In one embodiment, cameras 432 are calibrated by conventional methods. In one embodiment, calibration proceeds in part by displaying known patterns on display elements 422 and observing the images displayed using cameras 432. Pixels in the corresponding images generated by cameras 432 are mapped to pixels on the display elements 422 using conventional camera calibration techniques.

Figure 4B:
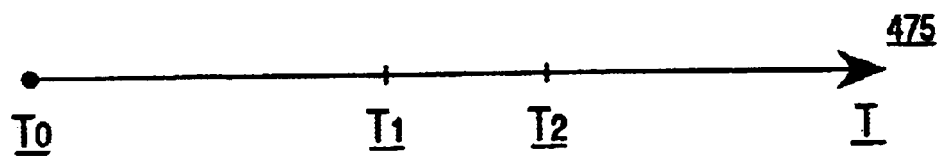
FIG. 4B depicts a video timeline for information selection for enhancing an ice hockey event according to one embodiment of the present invention.

FIG. 4B depicts a timeline 475. Time line 475 begins with the dropping of the puck at center ice at time $T_0$ to start the game with an initial face-off and runs through a time T in the future, which marks the end of the game. Selection of the time frame for display is performed by a television director. Where the relevant time period begins just as a particular period of play begins at time $T_1$ and ends just after the particular period of play ends at time $T_2$, the director chooses the time period from time $T_1$ through time $T_2$ as relevant. All information gathered by every camera from time $T_1$ through time $T_2$ is selected for replay by its corresponding timecode.

Figure 4C:
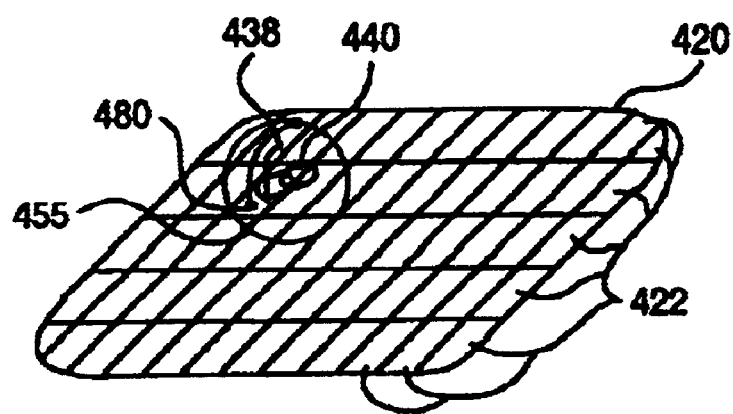
FIG. 4C depicts information display for enhancing an ice hockey event according to one embodiment of the present invention.
Figure 4D:
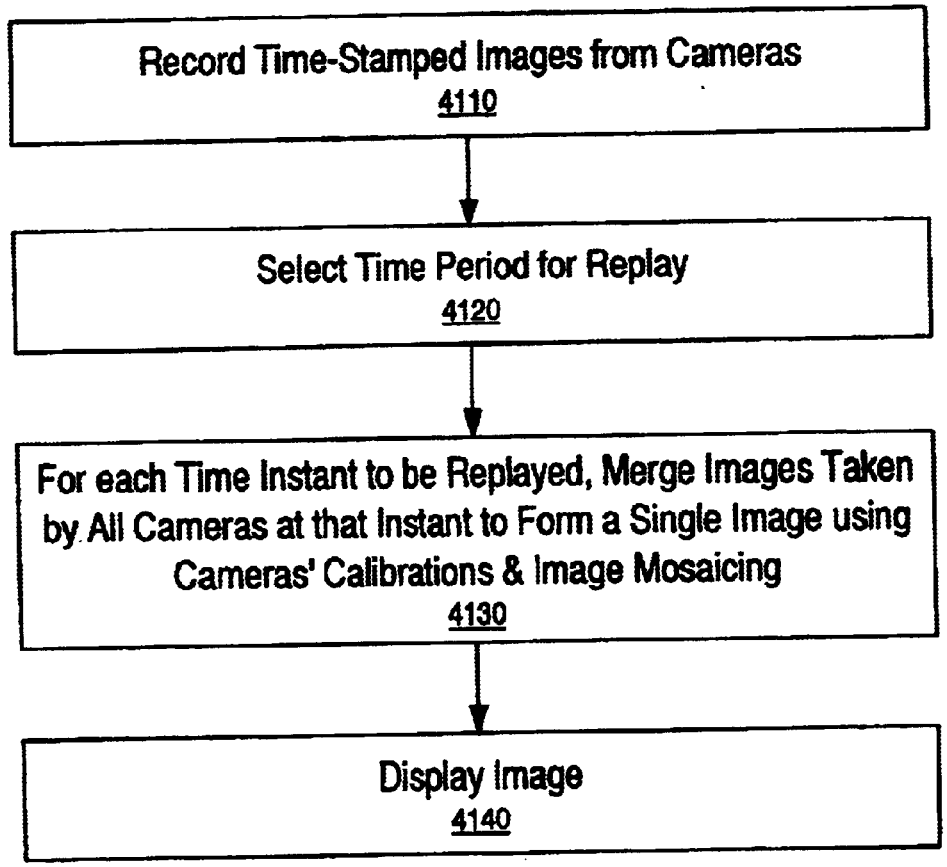
FIG. 4D is a flowchart of the steps in a first process for providing an onsite replay at an ice hockey event according to one embodiment of the present invention.

FIG. 4D is a flowchart of a process 4100, which effectuates a method of enhancing the ice hockey event for the live audience is described according to one embodiment of the present invention. Process 4100 begins with step 4110, wherein images from cameras 432 are timestamped according to their time of generation on timeline 475. In step 4120, a time period (e.g., time period $T_1$ through $T_2$; FIG. 4B) is selected for replay. In step 4130, for each time instant to be replayed, the images from all cameras are merged into a single image, which is displayed on the monitors 422 embedded in the ice of rink 420, completing process 4100. This consolidation of images from all the cameras into a single image can be effectuated, for instance, using the camera calibration techniques described above as well as conventional image mosaicing techniques.

In an alternative embodiment, recorded imagery is augmented or replaced with computer-generated images. The computer-generated images show, for example, a stylized view of each player showing the position of their sticks and their name and number, rather than imaging their whole body.

In another embodiment, imagery is recorded from cameras 432 around the arena. The cameras in this embodiment are calibrated by placing known three-dimensional (3D) objects at known locations on the ice of rink 420, taking images, and applying conventional camera calibration processes.

Figure 4E:
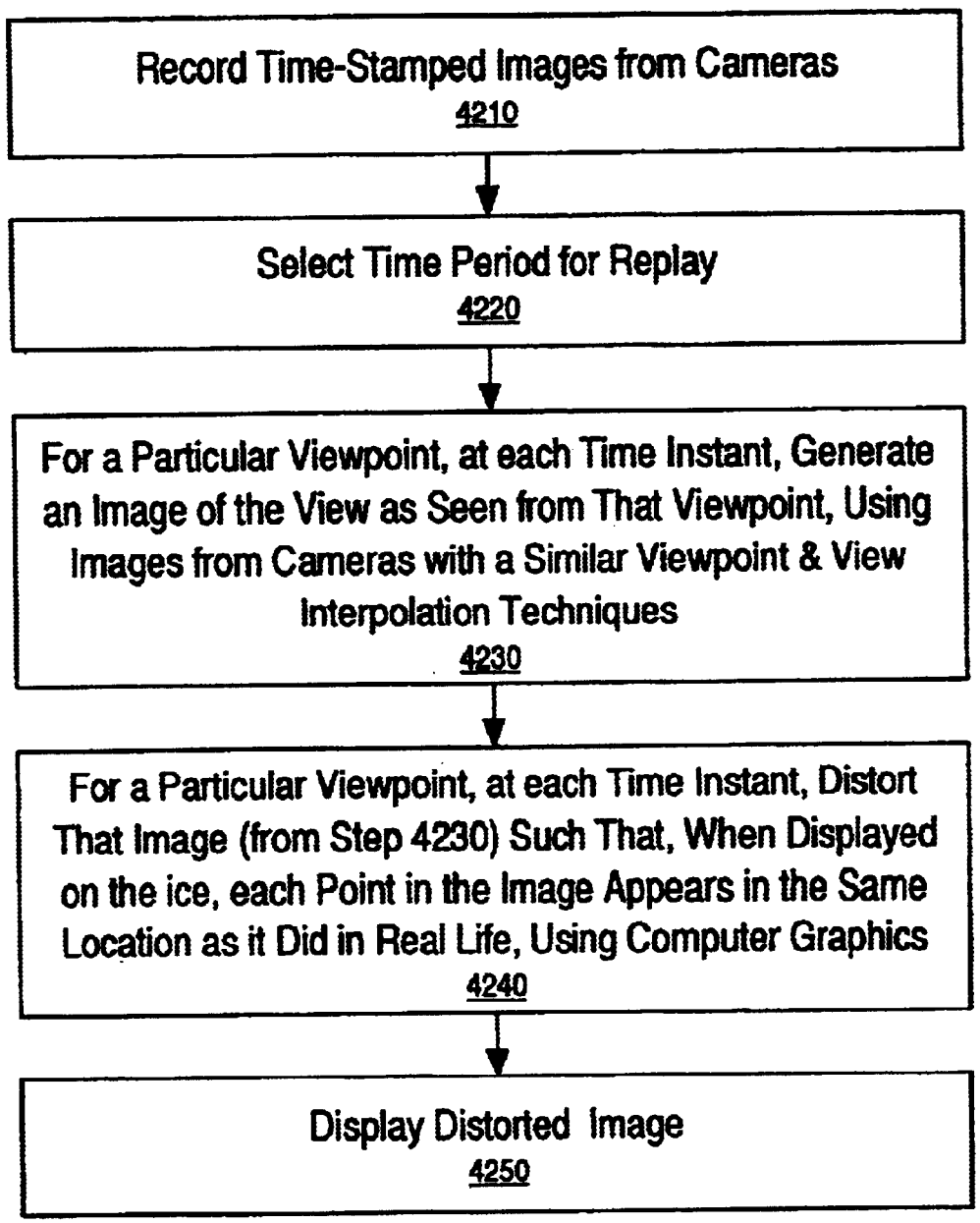
FIG. 4E is a flowchart of the steps in a second process for providing an on-site replay at an ice hockey event according to one embodiment of the present invention.

FIG. 4E is a flowchart of a process 4200, which effectuates a method of enhancing the ice hockey event for the live audience is described according to one embodiment of the present invention. Process 4200 begins with step 4210, wherein images from cameras 432 are timestamped according to their time of generation on timeline 475. In step 4220, a time period (e.g., time period $T_1$ through $T_2$; FIG. 4B) is selected for replay.

In step 4230, for a particular viewpoint, at each time instant, an image is generated of the view, as seen from that viewpoint. This can be effectuated, in one embodiment, by using images from cameras with a similar viewpoint and applying conventional view interpolation techniques.

In step 4240, for a particular viewpoint, at each time instant, the image generated (e.g., in step 4230) is distorted such that, when displayed on the ice (e.g., on display monitors such as display elements 422; FIGS. 4A, 4C), each point in the image appears in the same location as it did in real life. This can be effectuated, in one embodiment, by using conventional computer graphics techniques. In step 4250, the distorted image so formed is then displayed, completing process 4200.

FIG. 4C depicts an image 455 showing a representation 440 of a hockey player, a representation 438 of his stick, and a representative horizontal trajectory 480 of the path of the puck across a portion of the surface of the ice. Image 455 is exemplary of the image that can be displayed by display elements 420. Representations 440, 438 and 480 can be distorted images as formed by process 4200 (FIG. 4E), or non-distorted images formed by process 4100 (FIG. 4D).

Advantageously, in one embodiment, a part of the image 455 showing representation 440 and/or other representations can be displayed on the boards (e.g., wall) 488, also deploying monitor elements 422, which surrounds the ice of rink 420. Working best from a single viewpoint, the image 455 on board 488 in the present embodiment is also recognizable from nearby positions in the stands (not shown).

Although the image at those positions may be slightly distorted, the distortion varies with height from the ice surface of rink 420, more precisely, from the monitor elements 422 embedded thereunder. Thus, everyone in attendance at the ice hockey event can see the position of things in contact with the ice, such as puck 480, stick 438, the skates of player 440, etc., correctly.

In one embodiment, displays can be generated for several different viewpoints around the arena, and replayed for each of those different viewpoints. In a simplified embodiment, the replay can be of a single viewpoint. A more preferable option is to replay for one viewpoint and then another, and so on, sequentially.

Another embodiment effectuates replaying for all viewpoints simultaneously. The present embodiment can be effectuated using displays that are oriented towards appropriate audience members. For instance, an LED display can be deployed with baffles and/or Fresnel lensing, such that the light emitted by any particular LED is visible only to a certain audience section. In yet another embodiment, all viewpoints can also be replayed simultaneously using customized displays for different audience members. Shuttered glasses and/or electro-optical window sections can be applied to effectuate this effect.

Exemplary Tennis Implementation

Figure 5A:
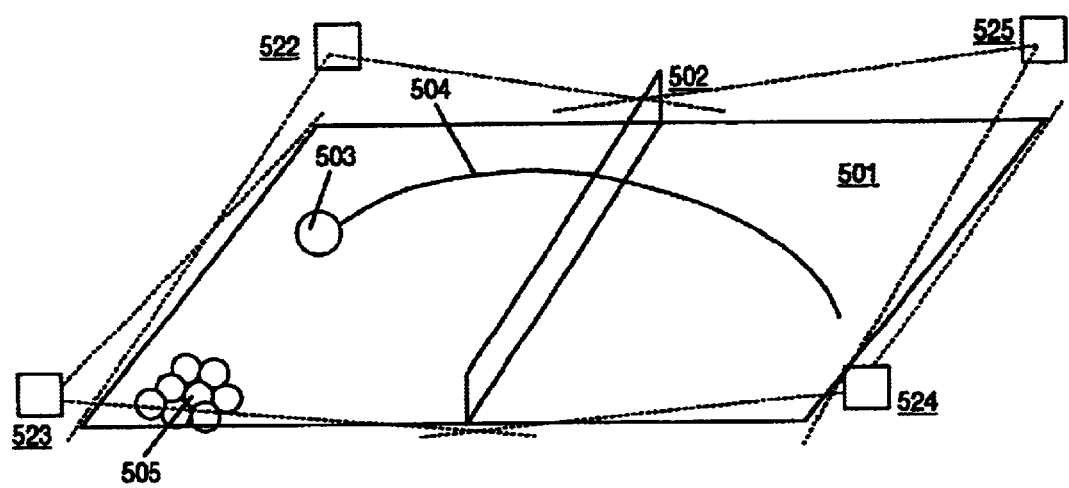
FIG. 5A depicts information collection and spatial correlation for enhancing a tennis event according to one embodiment of the present invention.
Figure 5B:
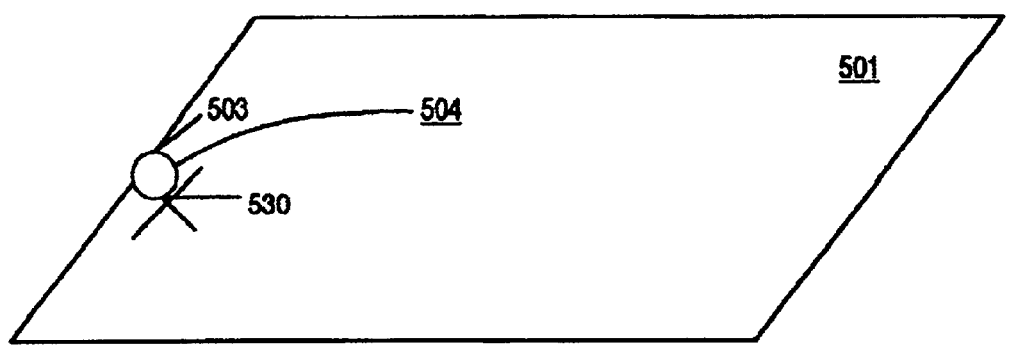
FIG. 5B depicts a video timeline for information selection for enhancing a tennis event according to one embodiment of the present invention.
Figure 5C:
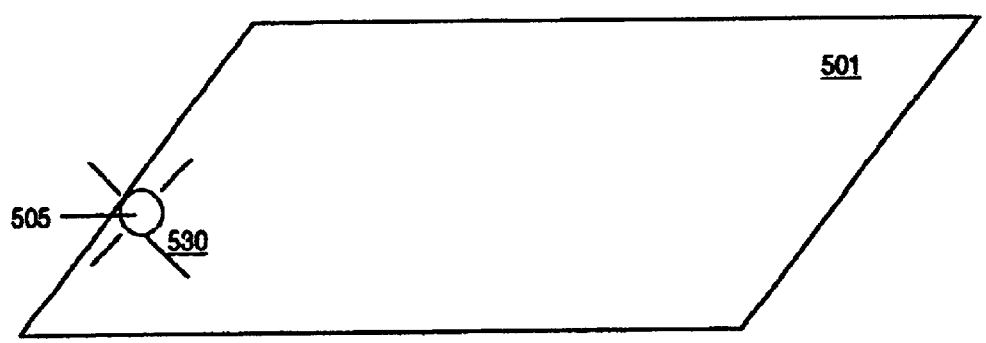
FIG. 5C depicts information display for enhancing a tennis event according to one embodiment of the present invention.
Figure 5D:
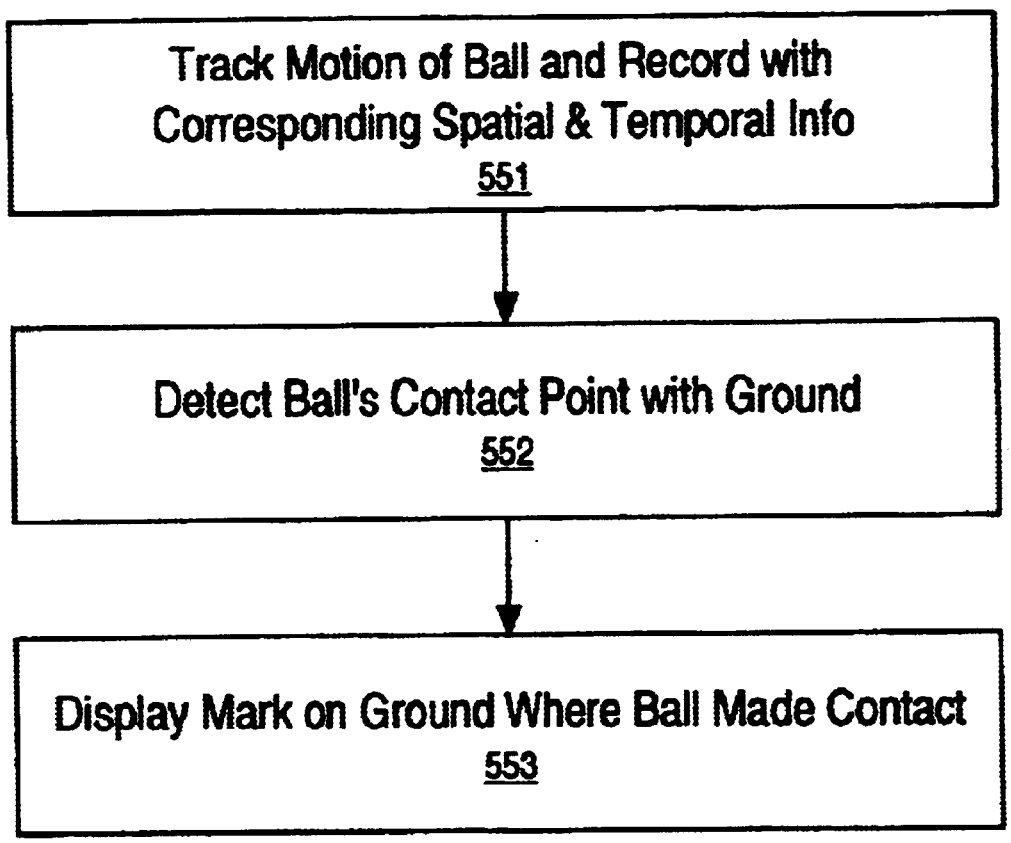
FIG. 5D is a flowchart of the steps in a process for enhancing a tennis event according to one embodiment of the present invention.

With reference now to FIG. 5D, a process 500 applies one embodiment of the present invention to a tennis implementation. FIGS. 5A–5C will be discussed concurrently with FIG. 5D for clarity and brevity to further describe the present implementation.

Process 500 begins with step 551, wherein the motion of a tennis ball is tracked and recorded with corresponding spatial and temporal information. Referring to FIG. 5A, a series of overhead cameras 522, 523, 524, and 525 is used in one embodiment to effectuate step 551 by tracking the trajectory 504 of tennis ball 503 from one section of tennis court 501 over net 502 into the opposite section. A series of small bright lights 505 such as LEDs or other electronically controllable lighting media is disposed uniformly throughout the surface of court 501. In one embodiment, lights 505 may be placed in areas of tennis court 501 near (e.g., within ½ meter) lines.

In step 552, the point at which the tennis ball 503 contacts the ground, essentially pixillary data, is detected. Cameras 522, 523, 524, and 525 are calibrated to confirm the contact point. With reference to FIG. 5B, the point 530 at which trajectory 504 of tennis ball 503 ends, e.g., at which tennis ball 503 bounces, is detected by one or more of cameras 522, 523, 524, and 525 (and/or confirmed by the other cameras, which are all calibrated for precise and accurate concurrence).

In step 553, a mark is displayed on the ground (e.g., the surface of the tennis court 501), completing process 500. This mark is displayed by illuminating the light 505 at spot 530. In another embodiment, the spot is displayed by co-calibrated projector beams. The illumination of the correct light 505 corresponding to the spot 530 at which the tennis ball 503 bounced is controlled by the calibration of cameras 522–525, as well as the operation of the cognizant system modules as described above (e.g., information collecting and correlation module 101, information selection module 102, information display module 103; FIGS. 1, 3). In one embodiment, these modules constitute a computer implemented system. In one embodiment, the spot fades after a pre-set period of time (e.g., 5–10 seconds) to gradually become invisible. The live audience, the officials, and the tennis players all get to observe the exact spot the tennis ball 503 struck the surface of tennis court 501, leaving no doubt, for instance, whether a certain bounce was "in" or "out," thus enhancing their live tennis sporting event as well as the conduct of the game.

Exemplary Baseball/Cricket Implementation

Figure 6A:
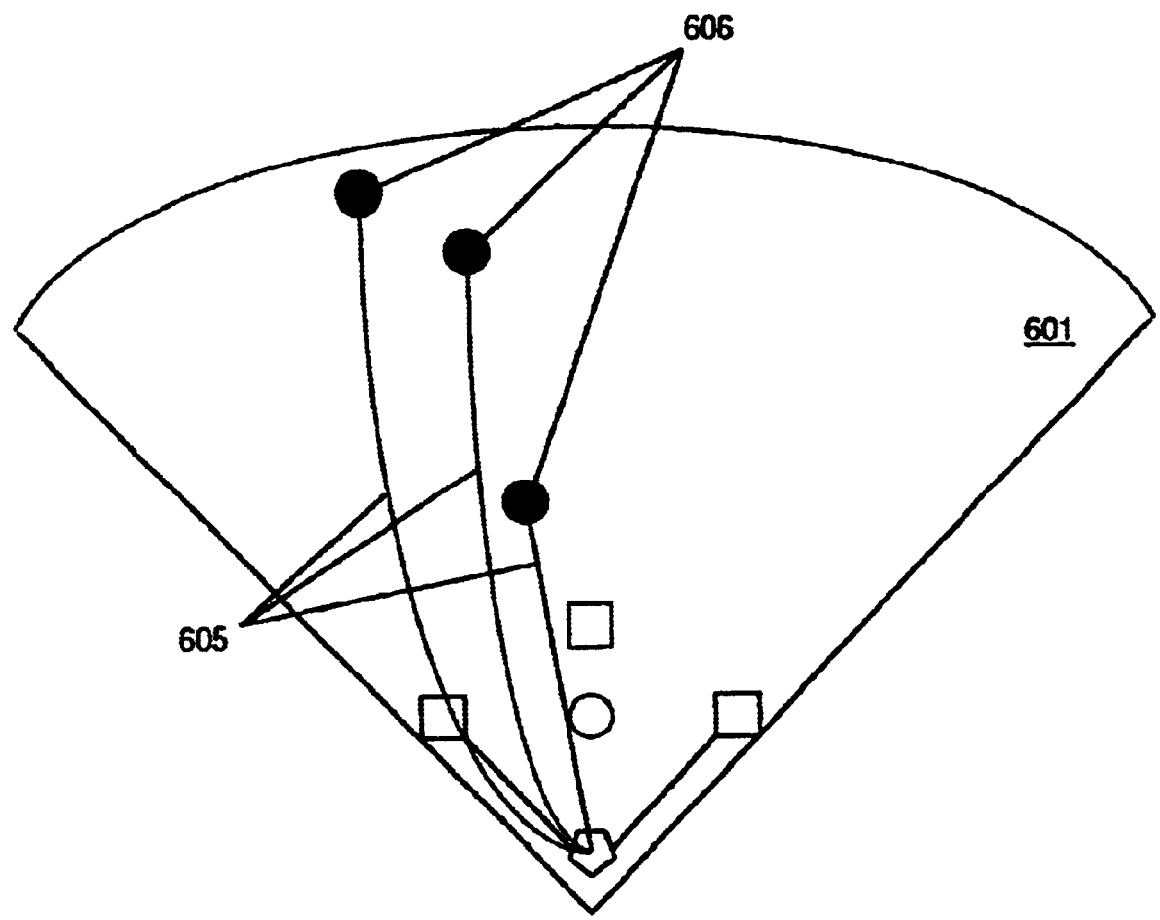
FIG. 6A depicts information collection and spatial correlation for enhancing a baseball event according to one embodiment of the present invention.
Figure 6B:
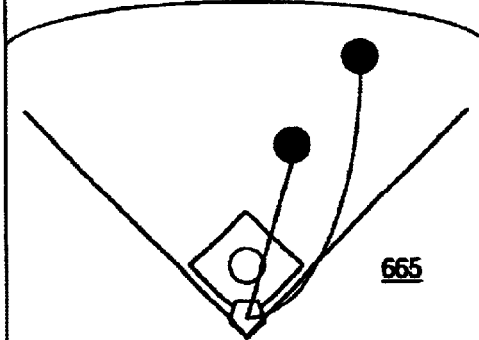
FIG. 6B depicts a video timeline for information selection for enhancing a baseball event according to one embodiment of the present invention.
Figure 6C:
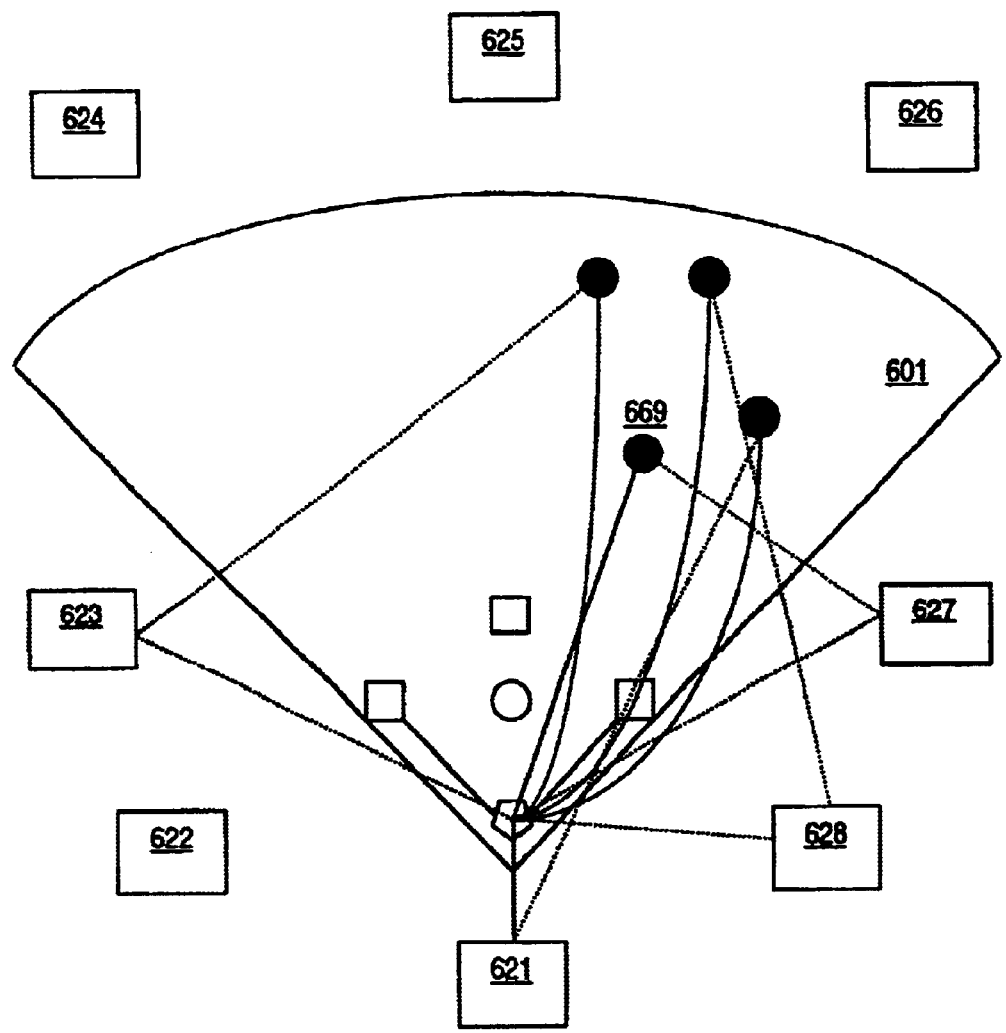
FIG. 6C depicts information display for enhancing a baseball event according to one embodiment of the present invention.

With reference now to FIG. 6D, a process 600 applies one embodiment of the present invention to an implementation for baseball or cricket. FIGS. 6A–6C will be discussed concurrently with FIG. 6D in the context of a baseball example for clarity and brevity to further describe the present implementation.

With reference to FIG. 6A, the historical batting performance of a batter/batsman is depicted as a group of trajectories 605. These trajectories are mapped over baseball field 601, originating at home plate and terminating at individual points 606. It is seen that one trajectory ends deep in left field; another ends in mid-left/center field and a third shows a line drive to short center field just left of second base. These trajectories correlate relevant information: historical performance of a batter/batsman, to spatial locations, where the trajectory ends. Such trajectories can represent hits, flies out, fielded ground balls, runs, bunts, etc. This information can be selected based on the performance of a particular batter/batsman against a certain pitcher, the particular field of play (e.g., Yankee Stadium in The Bronx, New York, N.Y.; Dodger Stadium in Los Angeles, Calif.; etc.), weather, recentness, etc. Process 600 begins with step 651, wherein information such as these trajectories are accessed and entered with corresponding locations.

In step 652, information is selected based on for example, a particular batter/batsman against a certain pitcher on a particular field, for the current game and for previous games. With reference to FIG. 6B, a graphical user interface (GUI) 660 effectuates the selection of relevant information. In the prompt fields 661, relevant information to be selected is displayed for a user, who in one embodiment, enters or allows automatic entry of corresponding data into script entry fields 662. As depicted in FIG. 6B, the field of play is Yankee Stadium, the home team is the New York Yankees, the away team is the Oakland Athletics, and the away team is at bat. The pitcher is listed by name and jersey number, as is the batter at bat.

In one embodiment, upon display of the batter's name and jersey number, databases (e.g., information database 301, location database 303; FIG. 3) are consulted. Relevant information is gathered from each and correlated, and this batter's historical performance is determined against this pitcher at this field, and taking into consideration any other information deemed relevant and selected accordingly (weather, recentness, etc.). This information is returned and processed and a display field 665 co-operational with GUI 660 depicts for the user this batter's historical performance. Any visual scheme can be used to codify this information graphically. For example, GUI 660 specifies that runs are depicted by gold trajectories, hits by green trajectories, and flies out by red trajectories; those trajectories denoting events in the current game are depicted in solid lines (bunts, line drives, and ground balls, etc.) and curves (fly ball trajectories, etc.). It is appreciated that other schema may be preferable and may be substituted for the exemplary scheme used herein.

In step 653, the batter's performance and corresponding codified trajectory traces are projected onto the field, completing process 600. With reference to FIG. 6C, a baseball field 601 is depicted. Projectors 621, 622, 623, 624, 625, 626, 627, and 628 are mounted high over the periphery of field 601. These projectors, under the control of a display control mechanism (e.g., display control module 307; FIG. 3), display by projection the information displayed in display field 665 of GUI 660. This information (e.g., codified as hits, runs, outs, this game, recent games, etc.), is thus rendered visible to the live audience, as well as to the players on the field 601. The live baseball experience of the live audience is thus enhanced.

Further, players may respond to the information to adjust their fielding positions in anticipation of the batter's instant performance. The batter himself can use this information as a self-check, or reacting to the fielding players' positional adjustments, may attempt to adjust his hitting performance. Thus, in addition to enhancing the sporting event for the live audience, the present embodiment enhances the event for the players as well, by introducing an information-based dynamic to the play.

Exemplary Downhill Skiing Implementation

Figure 7A:
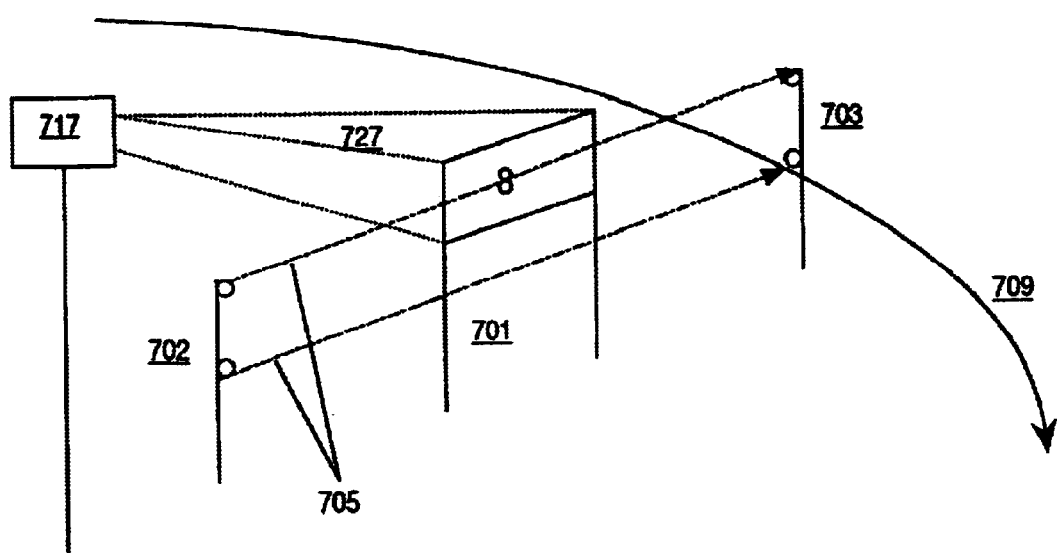
FIG. 7A depicts information collection and spatial correlation for enhancing a skiing event according to one embodiment of the present invention.
Figure 7B:
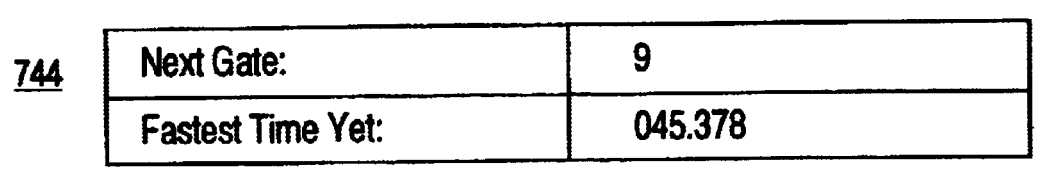
Figure 7C:
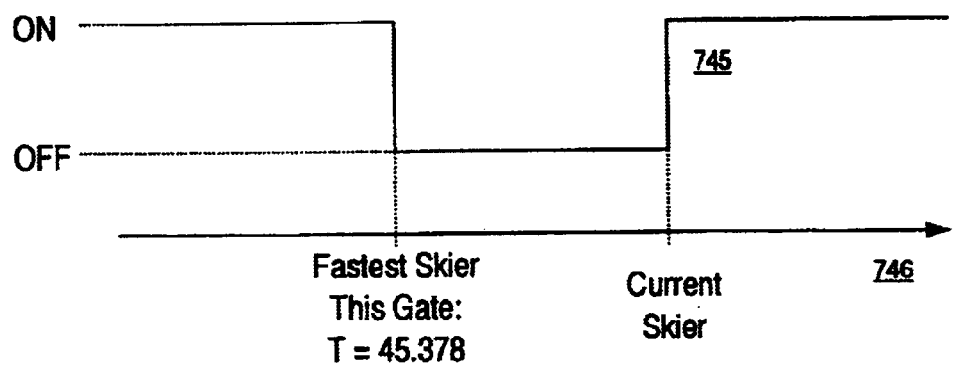
FIG. 7C depicts information display for enhancing a skiing event according to one embodiment of the present invention.
Figure 7D:
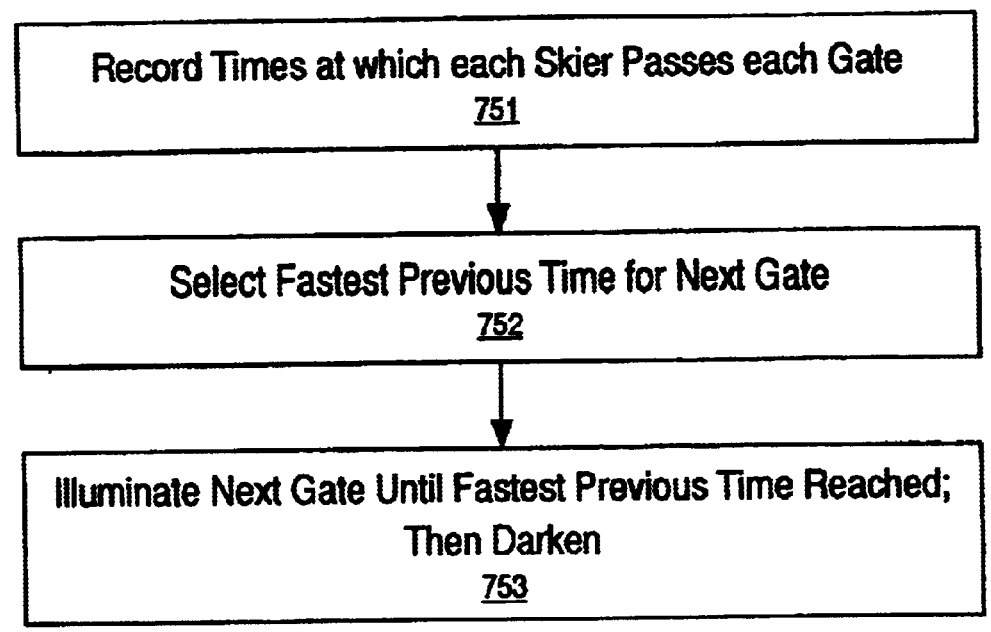
FIG. 7D is a flowchart of the steps in a process for enhancing a skiing event according to one embodiment of the present invention.

With reference now to FIG. 7D, a process 700 applies one embodiment of the present invention to an implementation for downhill skiing. FIGS. 7A–7C will be discussed concurrently with FIG. 7D for clarity and brevity to further describe the present implementation.

Process 700 begins with step 751, wherein the times at which each skier passes each gate are recorded and stored. With reference to FIG. 7A, a gate 701 (e.g., "Gate 8") marks a point that must be traversed by a skier's path 709.

The gate can be illuminated for visibility by visible light from a fixedly mounted light source 717. The skier's passing of this gate can be determined by any of several well known means. In the present embodiment, infrared or visible light beams 705 are emitted by fixedly-mounted light sources 702 at fixedly mounted photoelectric detectors 703. As the skier traverses gate 701 on her downhill path 709, she interrupts light beams 705 and her traversal of gate 701 is detected. The time at which her traversal of gate 701 occurred can thus be recorded.

In step 752, the fastest previous time is selected at which the next gate was traversed. With reference to FIG. 7B, a display 744 shows that the next gate the skier will encounter is Gate 9, and that the fastest time that that gate has been traversed by any skier in the current skiing event is 45.378 seconds after beginning the course. Thus, the current skier must pass Gate 9 before her own run time accumulates 45.378 seconds to beat the current fastest time.

The light source 717 illuminating the next gate is under the control of a display control mechanism (e.g., display control module 307; FIG. 3). In step 753, the next gate (e.g., Gate 9) is illuminated until the fastest previous time (e.g., 45.378 seconds) is reached, at which point the gate is darkened by the display control mechanism switching off the illumination source 717. With reference to FIG. 7C, timeline 746 and illumination record 745 show that light source 717 at the next gate illuminates that next gate until the previous fastest time is reached. At that time, the gate is darkened until traversed by the current skier. Thus, if the current skier beats the previous fastest time, the gate will not darken at all during her run.

The live skiing audience can observe the lit or dark condition of the gate, thus determining the current skier's performance without having to take their eyes off the skier to look for a separate display or listen for an announcement. This enhances their live downhill skiing event. However, the enhancement of the experience is also available to the skiers themselves. The skiers can see whether the gate is lit or darkened at their approach, and thus can surmise their performance level in their current run at each gate without breaking concentration, and can take efforts to adjust their performance accordingly.

An embodiment of the present invention, a method for enhancing a sporting event by localized display of information, is thus described. While the present invention has been described in particular embodiments, the present invention should not be construed as limited by such embodiments, but rather construed according to the following claims and their equivalents.

What is claimed is:

1. A method for enhancing a sporting event comprising:
    collecting information;
    correlating said information with an associated spatial location;
    selecting a portion of said information based on its relevance; and
    displaying said portion of said information at said spatial location.

2. The method as recited in claim 1 wherein said spatial location comprises a part of a surface upon which said sporting event takes place.

3. The method as recited in claim 1 wherein said collecting information comprises a technique selected from the group consisting essentially of recording video imagery and accessing information from a database.

4. The method as recited in claim 3 wherein said recording is performed by cameras positioned substantially higher than said surface upon which said sporting event takes place.

5. The method as recited in claim 1 wherein said information is selected from the group consisting essentially of live action images of a first part of said sporting event, historical imagery recorded of a second part of said sporting event wherein said second part occurs before said first part, statistical data, and records of play of selectively the same said sporting event and a different sporting event.

6. The method as recited in claim 5 wherein said correlating comprises mapping said information to said surface upon which said sporting event takes place.

7. The method as recited in claim 1 wherein said displaying comprises visually presenting said information by a technique selected from the group consisting essentially of:
    a video monitor disposed such that its image appears selectively on, beneath, and above the surface of a part of a surface upon which said sporting event takes place;
    a light disposed such that when lit, its illumination appears as a light selectively on, beneath, and above the surface of a part of a surface upon which said sporting event takes place; and
    a projector projecting an image that appears selectively on, beneath, and above the surface of a part of a surface upon which said sporting event takes place.

8. A system for enhancing a sporting event comprising:
    a first mechanism for collecting information and correlating said information with an associated spatial location; and
    a second mechanism for displaying said information at said spatial location, said second mechanism disposed to receive said information from said first mechanism.

9. The system as recited in claim 8 further comprising a third mechanism for selecting a portion of said information based on its relevance, said third mechanism disposed to select said information from said first mechanism and transfer said information to said second mechanism.

10. The system as recited in claim 8 wherein said spatial location comprises a part of a surface upon which said sporting event takes place.

11. The system as recited in claim 8 wherein said collecting information comprises a technique selected from the group consisting essentially of recording video imagery and accessing information from a database.

12. The system as recited in claim 11 wherein said recording is performed by cameras positioned substantially higher than said surface upon which said sporting event takes place.

13. The system as recited in claim 8 wherein said information is selected from the group consisting essentially of live action images of a first part of said sporting event, historical imagery recorded of a second part of said sporting event wherein said second part occurs before said first part, statistical data, and records of play of selectively the same said sporting event and a different sporting event.

14. The system as recited in claim 13 wherein said correlating comprises mapping said information to said surface upon which said sporting event takes place.

15. The system as recited in claim 8 wherein said displaying comprises visually presenting said information by a technique selected from the group consisting essentially of:
    a video monitor disposed such that its image appears selectively on, beneath, and above the surface of a part of a surface upon which said sporting event takes place;
    a light disposed such that when lit, its illumination appears as a light selectively on, beneath, and above the surface of a part of a surface upon which said sporting event takes place; and a projector projecting an image that appears selectively on, beneath, and above the surface of a part of a surface upon which said sporting event takes place.

16. The system as recited in claim 8 wherein said first mechanism comprises:

a first module for collecting information selected from the group consisting essentially of video imagery and statistical data;

a second module for collecting spatial location information; and a third module for correlating said spatial location information and said information selected from the group consisting essentially of video imagery and statistical data.

17. The system as recited in claim 8 wherein said second mechanism comprises a module for controlling a display.

18. A method for displaying information at a sporting event comprising:

gathering said information;

associating said information with a spatial location on a surface upon which said sporting event takes place;

segregating said information from other data based on the significance of said information to the evolution of said sporting event; and exhibiting said information selectively on and proximate to a surface upon which said sporting event takes place.

19. The method as recited in claim 18 wherein an athlete takes an action relating to the conduct of said sporting event on the basis of said information.

* * * * *